US009083028B2

(12) United States Patent
Choi et al.

(10) Patent No.: US 9,083,028 B2
(45) Date of Patent: *Jul. 14, 2015

(54) SECONDARY BATTERY PACK OF NOVEL STRUCTURE

(75) Inventors: Jong Woon Choi, Cheongju-si (KR); Hyung Ku Yun, Daejeon (KR); Sang Hyuk Park, Daegu (KR)

(73) Assignee: LG CHEM, LTD., Seoul (KR)

( * ) Notice: Subject to any disclaimer, the term of this patent is extended or adjusted under 35 U.S.C. 154(b) by 349 days.

This patent is subject to a terminal disclaimer.

(21) Appl. No.: 13/421,246

(22) Filed: Mar. 15, 2012

(65) Prior Publication Data

US 2013/0040170 A1    Feb. 14, 2013

(30) Foreign Application Priority Data

Aug. 12, 2011    (KR) .......................... 10-2011-0080661

(51) Int. Cl.
| | |
|---|---|
| *H01M 2/10* | (2006.01) |
| *H01M 2/26* | (2006.01) |
| *H01M 2/02* | (2006.01) |
| *H01M 2/30* | (2006.01) |
| *H01M 10/42* | (2006.01) |
| *H01M 2/34* | (2006.01) |

(52) U.S. Cl.
CPC .......... *H01M 2/1066* (2013.01); *H01M 2/0212* (2013.01); *H01M 2/26* (2013.01); *H01M 2/266* (2013.01); *H01M 2/30* (2013.01); *H01M 2/344* (2013.01); *H01M 10/4257* (2013.01); *Y10T 29/4911* (2015.01); *Y10T 29/49108* (2015.01)

(58) Field of Classification Search
None
See application file for complete search history.

(56) References Cited

U.S. PATENT DOCUMENTS

| | | | |
|---|---|---|---|
| 6,368,744 B1 | 4/2002 | Hatazawa et al. | |
| 7,262,956 B2 | 8/2007 | Suzuki et al. | |
| 7,510,791 B2 | 3/2009 | Moon et al. | |
| 8,486,559 B2 * | 7/2013 | Koh et al. ..................... | 429/178 |
| 2005/0181242 A1 | 8/2005 | Suzuki et al. | |
| 2005/0208346 A1 * | 9/2005 | Moon et al. ....................... | 429/7 |
| 2006/0046139 A1 | 3/2006 | Suzuki et al. | |
| 2006/0093897 A1 * | 5/2006 | Choi et al. ..................... | 429/62 |
| 2006/0214632 A1 | 9/2006 | Lee et al. | |
| 2007/0264535 A1 * | 11/2007 | Lee et al. ............................ | 429/7 |
| 2009/0098417 A1 | 4/2009 | Yamada et al. | |

(Continued)

FOREIGN PATENT DOCUMENTS

| | | |
|---|---|---|
| EP | 1760804 A1 | 3/2007 |
| EP | 2725639 A2 | 4/2014 |

(Continued)

*Primary Examiner* — Sarah A Slifka
(74) *Attorney, Agent, or Firm* — Birch, Stewart, Kolasch & Birch, LLP

(57) ABSTRACT

Disclosed herein is a secondary battery pack including an anode and cathode terminal of a battery cell, the anode and cathode terminal being made of a plate-shaped conductive member, and being electrically connected to a PCM, a battery cell having the anode and cathode terminal formed at one end thereof, the battery cell being provided at the end thereof with a thermally welded surplus portion, and a PCM including a PCB having a protection circuit formed thereon, the PCB being provided at one side thereof with a cathode and an anode terminal connection portion and at the other side thereof with an external input and output terminal connection portion, an external input and output terminal electrically connected to the protection circuit of the PCB via the external input and output terminal connection portion of the PCB, and an electrically insulative PCM case.

16 Claims, 6 Drawing Sheets

(56) References Cited

U.S. PATENT DOCUMENTS

| | | |
|---|---|---|
| 2010/0035145 A1 | 2/2010 | Kim et al. |
| 2012/0276420 A1 | 11/2012 | Baek et al. |
| 2014/0147706 A1 | 5/2014 | Choi et al. |
| 2014/0147707 A1 | 5/2014 | Choi et al. |

FOREIGN PATENT DOCUMENTS

| | | |
|---|---|---|
| EP | 2731172 A2 | 5/2014 |
| EP | 2744017 A2 | 6/2014 |
| JP | 2000-156208 A | 6/2000 |
| JP | 2005-166644 A1 | 6/2005 |
| JP | 2009-99320 A1 | 5/2009 |
| KR | 10-2006-0103030 A | 9/2006 |
| KR | 10-2010-0082678 A | 7/2010 |
| KR | 10-2010-0121336 A | 11/2010 |
| KR | 10-2011-0066774 A | 6/2011 |
| TW | 201008004 A1 | 2/1999 |
| TW | 444420 | 7/2001 |
| TW | 200525801 | 8/2005 |
| TW | 200607136 | 2/2006 |
| TW | I390785 B1 | 3/2013 |
| WO | WO 2005/031897 A1 | 4/2005 |
| WO | WO 2010/128812 A3 | 11/2010 |
| WO | WO 2013/019066 A2 | 2/2013 |
| WO | WO 2013/022208 A2 | 2/2013 |
| WO | WO 2013/022211 A2 | 2/2013 |

* cited by examiner

SECONDARY BATTERY PACK OF NOVEL STRUCTURE

CROSS-REFERENCE TO RELATED APPLICATION

This application claims the benefit of earlier filing date and right of priority to Korean Application No. 10-2011-0080661 filed on Aug. 12, 2011, the contents of which are hereby incorporated by reference herein in their entirety.

TECHNICAL FIELD

The present invention relates to a secondary battery pack of a novel structure, and, more particularly, to a secondary battery pack including an anode terminal and a cathode terminal of a battery cell, the anode terminal and the cathode terminal being made of a plate-shaped conductive member, the anode terminal and the cathode terminal being electrically connected to a protection circuit module (PCM), a battery cell having the anode terminal and the cathode terminal formed at one end thereof, the battery cell being provided at the end thereof with a thermally welded surplus portion, and a PCM including a printed circuit board (PCB) having a protection circuit formed thereon, the PCB being provided at one side thereof with a cathode terminal connection portion and an anode terminal connection portion and at the other side thereof with an external input and output terminal connection portion, an external input and output terminal electrically connected to the protection circuit of the PCB via the external input and output terminal connection portion of the PCB, and an electrically insulative PCM case, in which the PCB 200 is mounted in an insertion fashion, the PCB being loaded on the thermally welded surplus portion of the battery cell in a direction in which the PCB faces an upper end of a main body of the battery cell.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as mobile devices.

Depending upon kinds of external devices in which secondary batteries are used, the secondary batteries may be configured to have a detachable type structure in which the secondary batteries can be easily inserted into and removed from the external devices or to have an embedded type structure in which the secondary batteries are embedded in the external devices. For example, it is possible for a user to insert or remove a battery into or from a device, such as a laptop computer. On the other hand, a device, such as a mobile phone, a MPEG audio layer-3 (mp3) player, a tablet PC or a smart pad, requires an embedded type battery pack due to the structure and capacity thereof.

Meanwhile, various kinds of combustible materials are contained in the lithium secondary battery. As a result, the lithium secondary battery may be heated or explode due to the overcharge of the battery, the overcurrent in the battery, or other physical external impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are connected to a battery cell.

Generally, an embedded type secondary battery pack uses a plate-shaped battery cell, which is suitable for electrical connection, and a PCM is connected to the battery cell via conductive nickel plates by welding or soldering. That is, the nickel plates are connected to electrode terminals of the battery cell by welding or soldering, a printed circuit board (PCB) is attached to one side of a double-sided adhesive tape, a protective tape is attached to the other side of the double-sided adhesive tape, and electrode tabs of the PCB and the nickel plates are connected to each other by welding in a state in which the PCB is in tight contact with the battery cell. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell.

To this end, insulative tapes are attached to various members, including the PCM. In addition, a sealed portion of a battery case, in which the battery cell is mounted, is partially bent, and an insulative tape is attached to it or a barcode is printed on it. That is, the process is very complicated.

Since a plurality of insulative tapes or parts is required to achieve safe connection as described above, a battery pack assembly process is complicated, and manufacturing cost is increased.

Also, when external impact is applied to the battery pack, the PCM may be damaged or dimensional stability may be greatly lowered due to the use of the insulative tapes, which exhibit low mechanical strength.

Therefore, there is a high necessity for a technology that is capable of reducing the number of members mounted to a battery cell to simplify an assembly process, achieving stable coupling between members loaded in the battery cell and protecting a PCM.

Furthermore, there is also a high necessity for a battery pack that is capable of providing large capacity while having the same size in consideration of the development trend of a device, the weight and size of which are reduced.

DISCLOSURE

Technical Problem

Therefore, the present invention has been made to solve the above problems, and other technical problems that have yet to be resolved.

Specifically, it is an object of the present invention to provide a secondary battery pack wherein a printed circuit board (PCB) is mounted in an electrically insulative protection circuit module (PCM) case in an insertion fashion, thereby achieving protection and insulation of a PCM and preventing electrode terminals of a battery cell from being exposed outside.

It is another object of the present invention to provide a secondary battery pack wherein the number of parts necessary to manufacture the battery pack is reduced, thereby simplifying an assembly process, and structural stability of the battery pack is improved.

It is another object of the present invention to provide a secondary battery pack wherein the interior structure of the battery pack is changed to provide the maximum capacity as compared with battery packs having the same standard.

It is a further object of the present invention to provide a PCM, which is protected from external impact, dimensional stability of which is high, and which is disposed at the outer side of a battery pack while having a neat appearance without wrinkles.

Technical Solution

In accordance with one aspect of the present invention, the above and other objects can be accomplished by the provision of a secondary battery pack including an anode terminal and a cathode terminal of a battery cell, the anode terminal and the cathode terminal being made of a plate-shaped conductive member, the anode terminal and the cathode terminal being electrically connected to a protection circuit module (PCM), a battery cell having the anode terminal and the cathode terminal formed at one end thereof, the battery cell being provided at the end thereof with a thermally welded surplus portion, and a PCM including a printed circuit board (PCB) having a protection circuit formed thereon, the PCB being provided at one side thereof with a cathode terminal connection portion and an anode terminal connection portion and at the other side thereof with an external input and output terminal connection portion, an external input and output terminal electrically connected to the protection circuit of the PCB via the external input and output terminal connection portion of the PCB, and an electrically insulative PCM case, in which the PCB 200 is mounted in an insertion fashion, the PCB being loaded on the thermally welded surplus portion of the battery cell in a direction in which the PCB faces an upper end of a main body of the battery cell.

In the secondary battery pack according to the present invention, as described above, the PCB is mounted in the electrically insulative PCM case in the insertion fashion. Consequently, it is possible to achieve protection and insulation of the PCM. Also, it is possible to easily prevent the electrode terminals from being exposed outside without insulating the electrode terminals using additional members.

Also, in the secondary battery pack according to the present invention, the PCM, which is configured to have a structure in which the PCB is mounted in a single PCM case in an insertion fashion, is loaded on the thermally welded surplus portion of the battery cell. As compared with a conventional embedded type secondary battery pack, therefore, it is possible to effectively protect the PCM and to considerably reduce the number of parts as compared with a case in which the PCM case is divided into two parts, thereby greatly improving manufacturing processability.

Furthermore, in the secondary battery pack according to the present invention, the PCB is mounted in the PCM case. As compared with a conventional embedded type battery pack in which a PCM is insulated with a conventional tape, therefore, a process of manufacturing the battery pack is easily carried out, a defect rate is relatively reduced, and the battery pack exhibits an aesthetically pleasing appearance without wrinkles at the outer side of the battery pack.

In addition, the PCB is loaded on the thermally welded surplus portion of the battery cell in the direction in which the PCB faces the upper end of the main body of the battery cell in a state in which the PCB is erected perpendicularly to the battery cell. Consequently, it is possible to shorten the thermally welded surplus portion of the battery cell as compared with a structure in which the PCB is loaded in parallel to the thermally welded surplus portion of the battery cell, thereby increasing capacity per unit volume of the secondary battery pack.

Preferably, the PCM case covers the PCM excluding the external input and output terminal. Consequently, the PCM case is loaded on the thermally welded surplus portion of the battery cell so as to entirely cover the PCM, thereby entirely securing stable installation and insulation.

In a concrete example, the PCM case may be configured to have a hollow box structure, one end of which is opened in the shape of a slit, through which the PCB is inserted. Consequently, dimensional stability of the PCM case is increased, and the PCB can be easily mounted in the PCM case.

Also, since the PCB is mounted in the PCM case, which is configured to have the hollow box structure, in the insertion fashion, it is possible to greatly reduce mounting time and process as compared with an assembly type PCM case using hooks.

Preferably, an insulative tape is further attached to an electrode terminal exposure region of the thermally welded surplus portion. As a result, it is possible to more effectively achieve insulation at the bent region. The insulative tape is preferably a double-sided adhesive tape. The double-sided adhesive tape provides coupling force between the PCM case and the thermally welded surplus portion when the PCM case is mounted, thereby further improving structural stability.

Various kinds of battery cells may be used in the secondary battery pack according to the present invention. The battery cell used in the secondary battery pack according to the present invention may be a pouch-shaped secondary battery, having an electrode assembly of a cathode/separator/anode structure mounted in a battery case made of a laminate sheet including a metal layer and a resin layer in a sealed state, the thickness and weight of which are small.

Preferably, the PCB is a flexible printed circuit board (FPCB). Consequently, the PCB may be easily bent as needed. For reference, the FPCB means a printed circuit board using a flexible insulative board.

As defined above, the PCB, having the protection circuit to control overcharge, overdischarge, overcurrent, etc. of the battery, is provided at one side thereof with the cathode terminal connection portion and the anode terminal connection portion and at the other side thereof with the external input and output terminal connection portion.

According to circumstances, a safety element may be further mounted between the anode terminal and/or the cathode terminal and the PCB to further secure safety of the secondary battery pack. Preferably, the safety element is positioned between the anode terminal of the battery cell and the PCB. Also, the safety element may be mounted in the PCM case together with the PCB in an insertion fashion, thereby securing structural stability.

Consequently, it is possible to connect the cathode terminal of the battery cell to the cathode terminal connection portion of the PCB without change in shape or without using additional members and to connect one side of the safety element to a safety element connection portion of the PCB located at the same side of the PCM in a state in which the anode terminal of the battery cell is connected to the other side of the safety element. As a result, the safety element, the structural strength is low, is stably mounted on the PCB, thereby reducing a defect rate in a manufacturing process and thus improving manufacturing process efficiency.

The safety element is an element to interrupt current when the temperature of the battery cell rises, thereby securing safety of the battery pack. For example, the safety element may be a positive temperature coefficient (PTC) element, the resistance of which increases with the increase of temperature, or a fuse, which is cut with the increase of temperature. However, the safety element is not limited to the PTC element or the fuse.

In an example, the form of the external input and output terminal is not particularly restricted so long as the external input and output terminal can be electrically connected to the PCB to supply current from an external device, such as a charger, to the battery cell or to supply current from the battery cell to a mobile phone, an mp3 player, etc. Preferably, the external input and output terminal is configured to have a plate structure in which a connector is mounted to one end thereof.

A nickel plate may be further mounted to one side of the cathode terminal, which is coupled to the cathode terminal connection portion of the PCB, by ultrasonic welding. Consequently, poor welding between the cathode terminal of the battery cell, which is generally made of aluminum, and the cathode terminal connection portion of the PCB, which is made of nickel, due to different properties therebetween is prevented.

Meanwhile, a label may be attached to the PCM and the battery cell, excluding the external input and output terminal and the top of the PCM, so as to cover the PCM and the battery cell. Specifically, the label may be configured to have a structure to cover the PCM and thermally welded outer circumferences provided at lateral sides of the battery cell excluding the external input and output terminal and the top of the PCM.

Consequently, it is possible to stably fix the thermally welded outer circumferences to the main body of the battery cell 100 while generally maintaining an insulated state, thereby more stably securing electrical connection between the electrode terminals of the battery cell and the PCB.

Preferably, the secondary battery pack according to the present invention is an embedded type secondary battery pack.

In accordance with another aspect of the present invention, there is provided a protection circuit module of a specific structure which is used to constitute the secondary battery pack with the above-stated construction.

Specifically, there is provided a protection circuit module (PCM) to be mounted to a top of a plate-shaped battery cell having electrode terminals, each of which is made of a plate-shaped conductive member, formed at an upper end thereof, wherein the PCM includes a printed circuit board (PCB) having a protection circuit formed thereon, the PCB being provided at one side thereof with a cathode terminal connection portion and an anode terminal connection portion and at the other side thereof with an external input and output terminal connection portion, an external input and output terminal electrically connected to the protection circuit of the PCB via the external input and output terminal connection portion of the PCB, and an electrically insulative PCM case, in which the PCB and a safety element are mounted in an insertion fashion, in a state in which an anode terminal and a cathode terminal are electrically connected to the PCB, the PCB being loaded on the thermally welded surplus portion of the battery cell in a direction in which the PCB faces an upper end of a main body of the battery cell.

In a general process of assembling an embedded type secondary battery pack, a connection member and a PCM are coupled, and an insulative tape is attached at each step, so that a PCM assembly is mounted on a battery cell, as previously described. That is, the PCM assembly is mounted to the battery cell using a large number of parts. Consequently, a large number of processes are required. Also, mechanical strength and structural stability of the battery pack are low.

On the other hand, the protection circuit module according to the present invention is configured to have a structure in which the PCM is mounted in the PCM case. Consequently, structural stability of the battery pack is improved, and a process of manufacturing the battery pack is greatly simplified.

Also, in the protection circuit module according to the present invention, it is possible to easily prevent the cathode terminal and the anode terminal from being exposed outside without insulating the cathode terminal and the anode terminal using additional members.

Furthermore, the PCB is loaded on the thermally welded surplus portion of the battery cell in the direction in which the PCB faces the upper end of the main body of the battery cell through the above-mentioned specific structure, and therefore, it is possible to maximize the capacity of the battery pack as compared with battery packs having the same standard.

In a preferred example, the external input and output terminal may be connected to one side of the PCB, an anode terminal connection portion and a cathode terminal connection portion may be formed at the other side of the PCB so that the anode terminal connection portion and the cathode terminal connection portion correspond to the anode terminal and the cathode terminal, respectively.

Preferably, the external input and output terminal is configured to have a plate structure in which a connector is mounted to one end thereof.

Preferably, the PCM case is configured to have a hollow box structure, one end of which is opened in the shape of a slit, through which the PCB is inserted.

In accordance with a further aspect of the present invention, there is provided a method of manufacturing the secondary battery pack with the above-stated construction.

Specifically, the secondary battery pack according to the present invention may be manufactured using a method of manufacturing a secondary battery pack including (a) connecting a nickel plate to a top of a cathode terminal of a battery cell by ultrasonic welding, (b) connecting an anode terminal and the cathode terminal of the battery cell to an anode terminal connection portion and a cathode terminal connection portion, formed at a rear of a PCB, by spot welding, (c) bending the electrode terminals of the battery cell and mounting a PCM to a thermally welded surplus portion of the battery cell, (d) inserting the PCM into a PCM case configured to have a hollow box structure, one end of which is opened in the shape of a slit, through which an external input and output terminal extends outward, and (e) covering the PCM and thermally welded outer circumferences provided at lateral sides of the battery cell, excluding the external input and output terminal and a top of the PCM, with a label.

As compared with a method of manufacturing a conventional embedded type secondary battery pack, the secondary battery pack manufacturing method according to the present invention can reduce the number of manufacturing processes and provide a secondary battery pack exhibiting improved structural stability.

Also, in the secondary battery pack manufacturing method, it is possible to achieve protection and insulation of the PCM using the PCM case without an additional member, such as a label or an insulative tape, and the cases are mounted after the PCM is electrically connected to the PCB and a bending process is completed. As a result, no exposure region is formed during the bending process, and therefore, additional insulative material is not needed.

According to circumstances, the secondary battery pack manufacturing method may further include attaching an insulative tape to an electrode terminal exposure region of the thermally welded surplus portion before the bending step.

Advantageous Effects

As is apparent from the above description, in a secondary battery pack according to the present invention, a printed circuit board (PCB) is mounted in an electrically insulative protection circuit module (PCM) case in an insertion fashion, thereby achieving protection and insulation of a PCM and preventing electrode terminals of a battery cell from being exposed outside.

Also, in the secondary battery pack according to the present invention, the PCM, including the PCM case, is loaded on a thermally welded surplus portion of the battery cell. Consequently, it is possible to simplify a battery pack assembly process and to improve structural stability of the battery pack.

Furthermore, the secondary battery pack according to the present invention has a specific interior structure, thereby providing the maximum capacity as compared with battery packs having the same standard.

In addition, in a PCM according to the present invention, the PCM is protected from external impact, dimensional stability of the PCM is high, and the PCM is disposed at the outer side of a battery pack while having a neat appearance without wrinkles.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
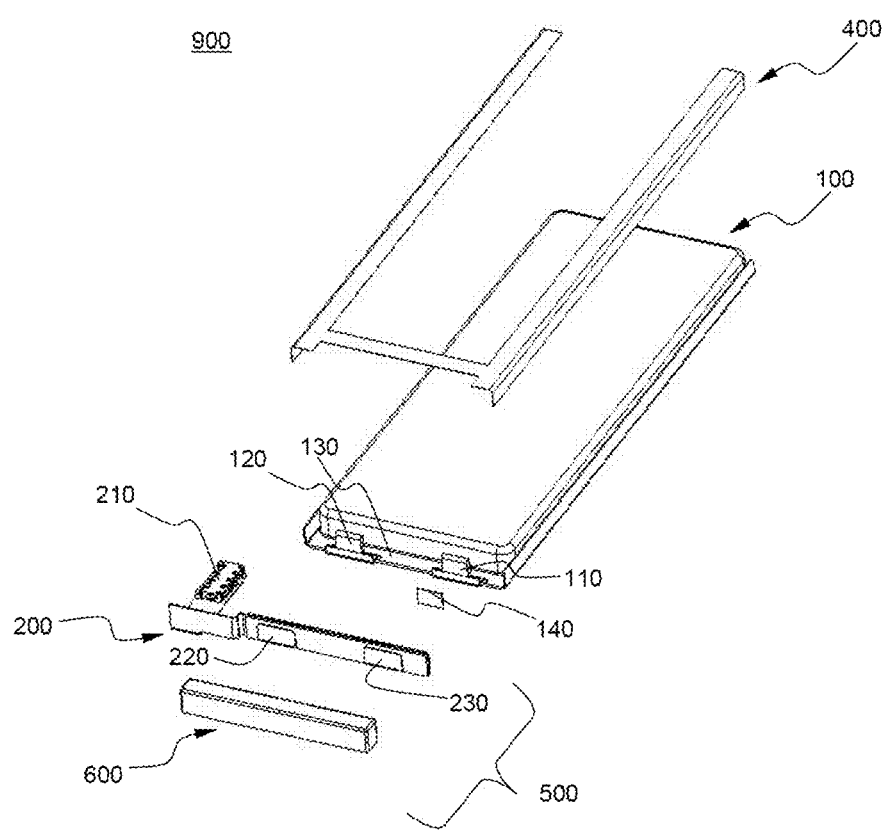
FIG. 1 is an exploded perspective view of a secondary battery pack according to an embodiment of the present invention.

FIG. 1 is an exploded perspective view of a secondary battery pack according to an embodiment of the present invention.

Referring to FIG. 1, a secondary battery pack 900 includes an anode terminal 120, a cathode terminal 110, a battery cell 100, a protection circuit module (PCM) 500, and a label 400.

The anode terminal 120 and the cathode terminal 110 of the battery cell 100 are plate-shaped conductive members. The anode terminal 120 and the cathode terminal 110 of the battery cell 100 are electrically connected to a printed circuit board (PCB) 200 of the PCM 500.

The anode terminal 120 and the cathode terminal 110 are formed at one end of the battery cell 100. A thermally welded surplus portion 130 is formed at an upper-end case extension portion of the battery cell 100.

The PCM 500 includes a PCB 200 having a protection circuit formed thereon, an external input and output terminal 210 electrically connected to the protection circuit of the PCB 200, and an electrically insulative PCM case 600, in which the PCB 200 is mounted in an insertion fashion.

Also, the PCB 200 is loaded on the thermally welded surplus portion 130 of the battery cell 100 in a direction in which the PCB 200 faces the upper end of a main body of the battery cell 100.

In the secondary battery pack 900 according to the present invention, which is an embedded type secondary battery pack, therefore, the PCM 500, configured to have a structure in which the PCB 200 electrically connected to the cathode terminal 110 and the anode terminal 120 of the battery cell 100 is mounted in a PCM case 600 in an insertion fashion, is loaded on the thermally welded surplus portion 130, located at the upper-end case extension portion of the battery cell 100. As compared with a conventional embedded type secondary battery pack, therefore, it is possible to effectively protect the PCM 500 and to considerably reduce the number of parts, thereby greatly improving manufacturing processability.

The battery cell 100 is a pouch-shaped secondary battery having an electrode assembly of a cathode/separator/anode structure mounted in a battery case made of a laminate sheet including a metal layer and a resin layer in a sealed state.

Figure 9:
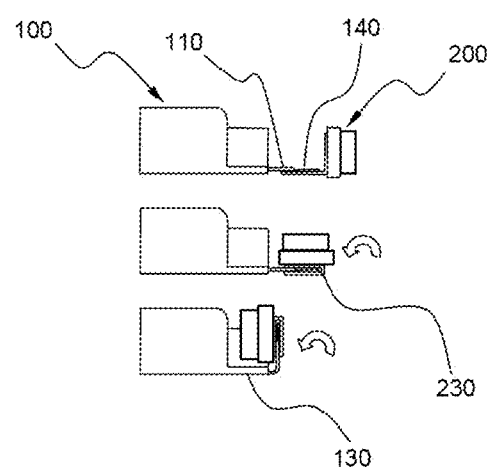
FIG. 9 is a series of partial typical views showing a process of bending a printed circuit board (PCB) according to an embodiment of the present invention.

The external input and output terminal 210 is connected to one side of the PCB 200, which is a flexible printed circuit board. An anode terminal connection portion 220 and a cathode terminal connection portion 230 are formed at the other side of the PCB 200 so that the anode terminal connection portion 220 and the cathode terminal connection portion 230 correspond to the anode terminal 120 and the cathode terminal 110, respectively. As shown in FIG. 9, which will be described below, the anode terminal connection portion 220 and the cathode terminal connection portion 230 are configured to have a structure in which one end of the anode terminal connection portion 220 and one end of the cathode terminal connection portion 230 are coupled to the PCB 200 while the other end of the anode terminal connection portion 220 and the other end of the cathode terminal connection portion 230 extend in the form of L so that the other end of the anode terminal connection portion 220 and the other end of the cathode terminal connection portion 230 can be bent.

Also, the external input and output terminal 210 has a plate structure in which a connector is mounted to one end thereof, and the PCM case 600 has a hollow box structure in which the PCB 200 is mounted in an insertion fashion.

FIGS. 2 to 8 are perspective views sequentially showing a process of manufacturing the secondary battery pack of FIG. 1.

The process of manufacturing the secondary battery pack will be described with reference to these drawings together with FIG. 1.

Figure 2:
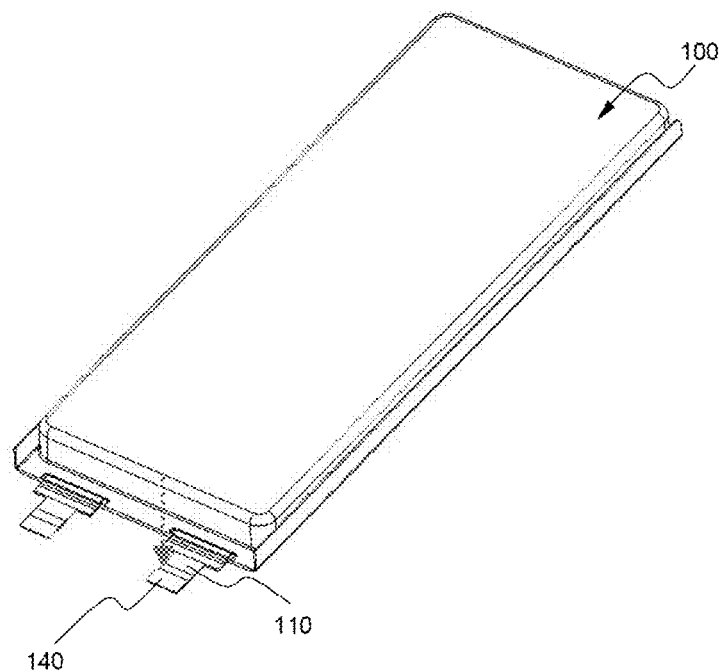
FIGS. 2 to 8 are perspective views showing a process of manufacturing the secondary battery pack of FIG. 1.

First, referring to FIG. 2, a nickel plate 140 is connected to the top of a cathode terminal 110 of a battery cell 100, which will be coupled to a cathode terminal connection portion 230 of a PCB 200, by ultrasonic welding.

Figure 3:
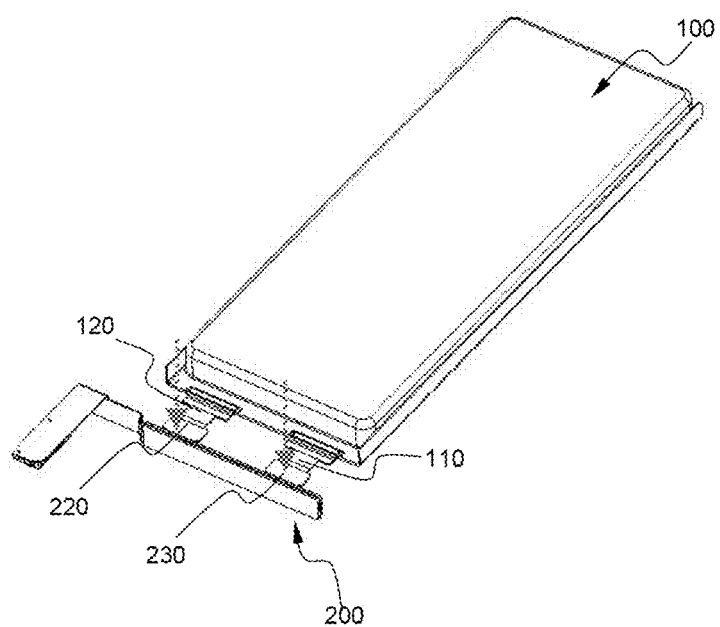

Next, referring to FIG. 3, an anode terminal 120 and the cathode terminal 110 of the battery cell 100 are connected to an anode terminal connection portion 220 and the cathode terminal connection portion 230, formed at the other side of the PCB 200, by spot welding.

Figure 4:
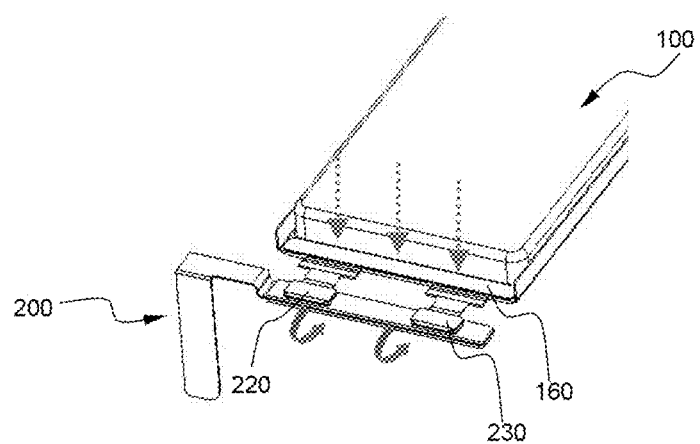

Referring to FIG. 4, the PCB 200 is perpendicularly bent so that the anode terminal connection portion 220 and the cathode terminal connection portion 230 are arranged in parallel to the battery cell 100, and then a double-sided adhesive tape 160 is attached to an electrode terminal exposure region of a thermally welded surplus portion 130, which is the upper end of a main body of the battery cell 100.

Figure 5:
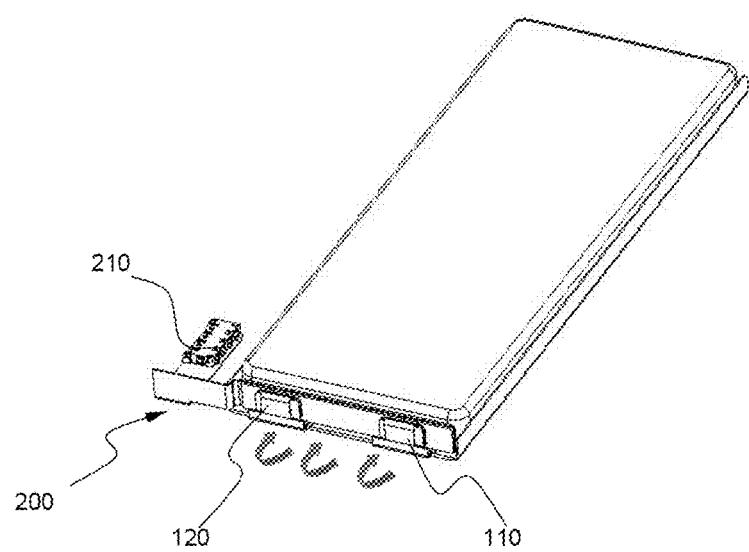

Referring to FIG. 5, the anode terminal 120 and the cathode terminal 110 of the battery cell 100 are bent upward, and the PCB 200 is mounted on the thermally welded surplus portion 130 of the battery cell 100.

Figure 6:
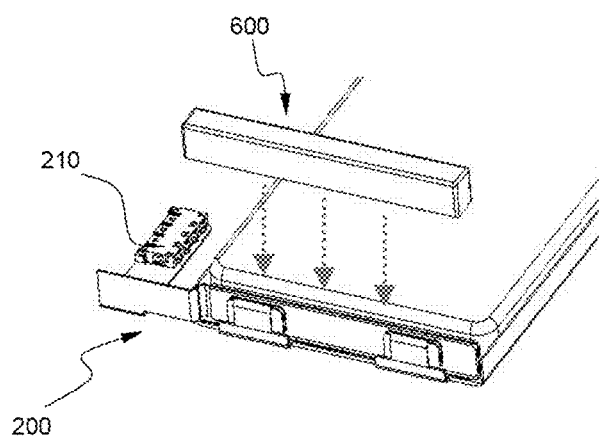
Figure 7:
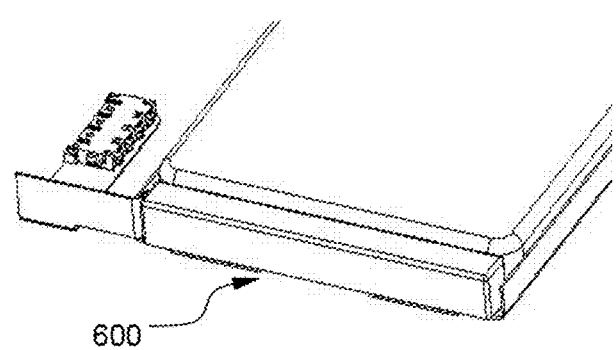

Referring to FIGS. 6 and 7, a PCM case 600 configured to have a hollow box structure, one end (not shown) of which is opened in the shape of a slit, through which an external input and output terminal 210 extends outward, is mounted to the PCB 200.

Figure 8:
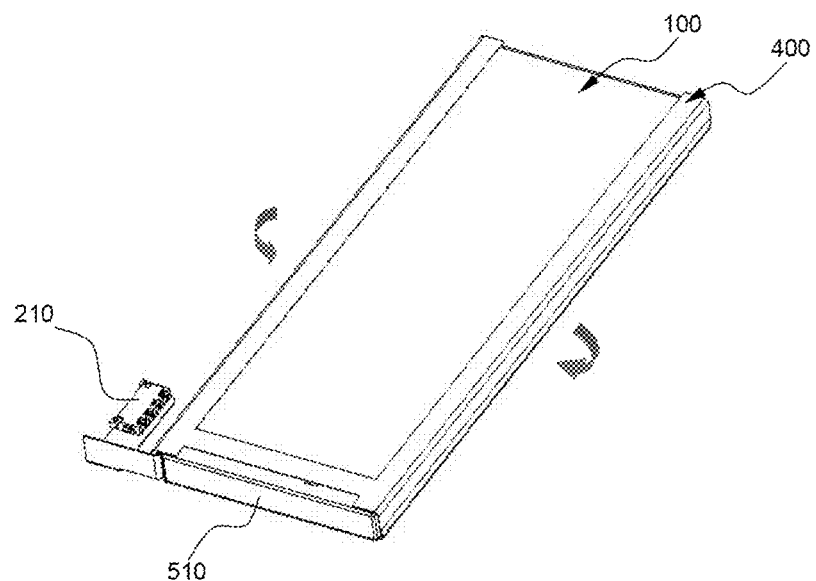

Finally, referring to FIG. 8, thermally welded outer circumferences provided at the lateral sides of a PCM 500 and the battery cell 100, excluding the external input and output terminal 210 and the top of the PCM 500, are covered by a label 400.

Consequently, the label 400 tightly fixes the thermally welded outer circumferences to the main body of the battery cell 100 while maintaining insulation with the battery cell 100, thereby more stably securing electrical connection between the cathode terminal 110 and the anode terminal 120 of the battery cell 100 and the PCB 200.

FIG. 9 typically shows a series of processes of bending a PCB according to an embodiment of the present invention. For the convenience of description, a cathode connection process is shown in FIG. 9.

When comparing FIG. 9 with FIGS. 3 to 5, the cathode terminal connection portion 230 of the PCB 200 is welded to the nickel plate 140 of the cathode terminal 110, the cathode terminal connection portion 230 is bent, and the PCB 200 is bent so that the PCB 200 is parallel to the top of the battery cell 100. That is, the cathode terminal 110 is bent twice.

As a result, the PCB 200 is loaded on the thermally welded surplus portion 130 of the battery cell 100 in the direction in which the PCB 200 faces the upper end of the main body of the battery cell 100. Consequently, the size of the thermally welded surplus portion 130 may be reduced. Also, the overall installation height of the PCM is reduced, and therefore, it is possible to increase the height of the battery cell 100 while having the same overall size of the battery pack, thereby maximizing capacity of the battery pack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
an anode terminal and a cathode terminal of a battery cell, the anode terminal and the cathode terminal being made of a plate-shaped conductive member, the anode terminal and the cathode terminal being electrically connected to a protection circuit module (PCM);
a battery cell having the anode terminal and the cathode terminal formed at one end thereof, the battery cell being provided at the end thereof with a thermally welded surplus portion; and
the PCM comprising a printed circuit board (PCB) having a protection circuit formed thereon, the PCB being provided at one side thereof with a cathode terminal connection portion and an anode terminal connection portion and at the other side thereof with an external input and output terminal connection portion, an external input and output terminal electrically connected to the protection circuit of the PCB via the external input and output terminal connection portion of the PCB, and an electrically insulative PCM case, in which the PCB is mounted in an insertion fashion, the PCB being loaded on the thermally welded surplus portion of the battery cell in a direction in which the PCB faces an upper end of a main body of the battery cell in a state in which the PCB is erected perpendicular to the battery cell,
wherein the PCM case is configured to have a hollow box structure, one end of which is opened in the shape of a slit, through which the PCB is inserted,
wherein the thermally welded surplus portion is formed at an upper-end case extension portion of the battery cell, and
wherein the battery cell is a secondary battery having a battery case made of a laminate sheet comprising a metal layer and a resin layer in a sealed state.

2. The secondary battery pack according to claim 1, wherein the PCM case covers the PCM excluding the external input and output terminal.

3. The secondary battery pack according to claim 1, further comprising an insulative tape further attached to an electrode terminal exposure region of the thermally welded surplus portion.

4. The secondary battery pack according to claim 3, wherein the insulative tape is a double-sided adhesive tape.

5. The secondary battery pack according to claim 1, wherein the battery cell is a secondary battery having an electrode assembly of a cathode/separator/anode structure mounted in the battery case.

6. The secondary battery pack according to claim 1, wherein the PCB is a flexible printed circuit board (FPCB).

7. The secondary battery pack according to claim 1, wherein the external input and output terminal is connected to one side of the PCB, and an anode terminal connection portion and a cathode terminal connection portion are formed at the other side of the PCB so that the anode terminal connection portion and the cathode terminal connection portion correspond to the anode terminal and the cathode terminal, respectively.

8. The secondary battery pack according to claim 7, further comprising a nickel plate further mounted to one side of the cathode terminal, which is coupled to the cathode terminal connection portion of the PCB, by ultrasonic welding.

9. The secondary battery pack according to claim 1, further comprising a safety element further mounted between the anode terminal and/or the cathode terminal and the PCB, wherein the safety element is mounted in the PCM case together with the PCB in an insertion fashion.

10. The secondary battery pack according to claim 1, wherein the external input and output terminal is configured to have a plate structure in which a connector is mounted to one end thereof.

11. The secondary battery pack according to claim 1, further comprising a label attached to the PCM and the battery cell, excluding the external input and output terminal and the top of the PCM, so as to cover the PCM and the battery cell.

12. The secondary battery pack according to claim 11, wherein the label is configured to have a structure to cover the PCM and thermally welded outer circumferences provided at lateral sides of the battery cell excluding the external input and output terminal and the top of the PCM.

13. A protection circuit module (PCM) to be mounted to a top of a plate-shaped battery cell having electrode terminals, each of which is made of a plate-shaped conductive member, formed at an upper end thereof, wherein
the PCM comprises a printed circuit board (PCB) having a protection circuit formed thereon, the PCB being provided at one side thereof with a cathode terminal connection portion and an anode terminal connection portion and at the other side thereof with an external input and output terminal connection portion, an external input and output terminal electrically connected to the protection circuit of the PCB via the external input and output terminal connection portion of the PCB, and an electrically insulative PCM case, in which the PCB and a safety element are mounted in an insertion fashion, in a state in which an anode terminal and a cathode terminal are electrically connected to the PCB, the PCB being loaded on a thermally welded surplus portion of the battery cell in a direction in which the PCB faces an upper end of a main body of the battery cell in a state in which the PCB is erected perpendicular to the battery cell, wherein the PCM case is configured to have a hollow box structure, one end of which is opened in the shape of a slit, through which the PCB is inserted, wherein the thermally welded surplus portion is formed at an upper-end case extension portion of the battery cell, and wherein the battery cell is a secondary battery having a battery case made of a laminate sheet comprising a metal layer and a resin layer in a sealed state.

14. The protection circuit module according to claim 13, wherein the external input and output terminal is connected to one side of the PCB, an anode terminal connection portion and a cathode terminal connection portion are formed at the other side of the PCB so that the anode terminal connection portion and the cathode terminal connection portion correspond to the anode terminal and the cathode terminal, respectively.

15. A method of manufacturing a secondary battery pack according to claim 1, the method comprising:
   (a) connecting a nickel plate to a top of a cathode terminal of a battery cell by ultrasonic welding;
   (b) connecting an anode terminal and the cathode terminal of the battery cell to an anode terminal connection portion and a cathode terminal connection portion, formed at a rear of a PCB, by spot welding;
   (c) bending the electrode terminals of the battery cell and mounting a PCM to a thermally welded surplus portion of the battery cell;
   (d) inserting the PCM into a PCM case configured to have a hollow box structure, one end of which is opened in the shape of a slit, through which an external input and output terminal extends outward; and
   (e) covering the PCM and thermally welded outer circumferences provided at lateral sides of the battery cell, excluding the external input and output terminal and a top of the PCM, with a label.

16. The method according to claim 15, further comprising attaching an insulative tape to an electrode terminal exposure region of the thermally welded surplus portion.

* * * * *